United States Patent
Schurig

(10) Patent No.: US 8,494,834 B2
(45) Date of Patent: Jul. 23, 2013

(54) METHODS AND SYSTEMS FOR USING AND UPDATING REMOTELY-GENERATED TRANSLATION PREDICTIONS DURING LOCAL, COMPUTER-AIDED TRANSLATION

(75) Inventor: Joachim Schurig, Berlin (DE)

(73) Assignee: Lionbridge Technologies, Inc., Waltham, MA (US)

(*) Notice: Subject to any disclaimer, the term of this patent is extended or adjusted under 35 U.S.C. 154(b) by 1439 days.

(21) Appl. No.: 11/562,116

(22) Filed: Nov. 21, 2006

(65) Prior Publication Data

US 2008/0120090 A1    May 22, 2008

(51) Int. Cl.
*G06F 17/28*    (2006.01)

(52) U.S. Cl.
USPC ............................ 704/3; 704/2; 704/7

(58) Field of Classification Search
USPC ........................................ 704/2, 3, 7
See application file for complete search history.

(56) References Cited

U.S. PATENT DOCUMENTS

| | | | |
|---|---|---|---|
| 5,497,319 A * | 3/1996 | Chong et al. | 704/2 |
| 7,020,601 B1 * | 3/2006 | Hummel et al. | 704/2 |
| 7,552,053 B2 * | 6/2009 | Gao et al. | 704/258 |
| 2001/0018649 A1 * | 8/2001 | Kasai et al. | 704/3 |
| 2002/0040359 A1 * | 4/2002 | Green et al. | 707/3 |
| 2002/0111787 A1 * | 8/2002 | Knyphausen et al. | 704/2 |
| 2002/0138250 A1 * | 9/2002 | Okura et al. | 704/2 |
| 2003/0004702 A1 * | 1/2003 | Higinbotham | 704/2 |
| 2003/0105621 A1 * | 6/2003 | Mercier | 704/2 |
| 2003/0154071 A1 * | 8/2003 | Shreve | 704/9 |
| 2003/0225569 A1 | 12/2003 | Shimamura | |
| 2004/0243403 A1 * | 12/2004 | Matsunaga et al. | 704/209 |
| 2005/0021322 A1 * | 1/2005 | Richardson et al. | 704/2 |
| 2005/0171944 A1 * | 8/2005 | Palmquist | 707/4 |
| 2005/0197827 A1 * | 9/2005 | Ross et al. | 704/2 |
| 2006/0116865 A1 * | 6/2006 | Cheng et al. | 704/2 |
| 2006/0136193 A1 * | 6/2006 | Lux-Pogodalla et al. | 704/2 |
| 2006/0206303 A1 * | 9/2006 | Kohlmeier et al. | 704/2 |
| 2007/0219774 A1 * | 9/2007 | Quirk et al. | 704/2 |
| 2007/0233456 A1 * | 10/2007 | Kim | 704/2 |
| 2007/0255550 A1 | 11/2007 | Menezes et al. | |
| 2007/0294076 A1 | 12/2007 | Shore et al. | |

(Continued)

FOREIGN PATENT DOCUMENTS

WO    WO-2005/059702    6/2005

OTHER PUBLICATIONS

Brockmann, "SDL Trados TM Server", Jul. 2006, pp. 1-15.

(Continued)

*Primary Examiner* — Douglas Godbold
(74) *Attorney, Agent, or Firm* — Finnegan, Henderson, Farabow, Garrett & Dunner LLP.

(57) ABSTRACT

A method for local, computer-aided translation using remotely-generated translation predictions includes the step of determining that a translation stored in a remote translation memory is useful in translating a first portion of a local document. A local machine receives the translation. Prior to receiving a request form a translator for the translation, a determination is made that the remote translation memory stores an updated version of the translation. The updated version of the translation is identified as useful in translating a second portion of the document. The local machine generates a translation of the second portion of the document through reuse of the updated version of the translation, responsive to the identification of the utility of the updated version of the translation in translating the second portion of the document.

33 Claims, 10 Drawing Sheets

U.S. PATENT DOCUMENTS

| | | | |
|---|---|---|---|
| 2008/0097743 A1* | 4/2008 | Hong et al. | 704/3 |
| 2008/0120088 A1* | 5/2008 | Schurig | 704/2 |
| 2008/0120089 A1 | 5/2008 | Schurig | |
| 2008/0120090 A1* | 5/2008 | Schurig | 704/2 |
| 2008/0288240 A1* | 11/2008 | D'Agostini | 704/3 |
| 2010/0076746 A1* | 3/2010 | Aikawa et al. | 704/3 |
| 2010/0204978 A1* | 8/2010 | Gao et al. | 704/2 |

OTHER PUBLICATIONS

International Search Report, PCT/US2007/084919, mailed on Jul. 9, 2008.

Smolej, "How to translate changing documents," Feb. 26, 2006 (available at www.proz.com/translation-articles/articles/604/1/How-to-translate-changing-documents).

Written Opinion of International Searching Authority, PCT/US2007/084919, mailed on Jul. 9, 2008.

Simões, A. et al., "Distributed translation Memories Implementation Using WebServices" *Procesamiento del Lenguaje Natural*, 33:89-94 (Jul. 2004).

Witkam, *Distributed Language Translation: Feasibility Study of a Multilingual Facility for Videotex Information Networks*. Utrecht, The Netherlands: BSO, 1983.

U.S. Appl. No. 11/562,110, filed Nov. 21, 2006, by Schurig: Office Action, mailed Sep. 3, 2010.

U.S. Appl. No. 11/562,110, filed Nov. 21, 2006, by Schurig: Examiner Interview Summary Record, mailed Oct. 28, 2010.

U.S. Appl. No. 11/562,110, filed Nov. 21, 2006, by Schurig: Notice of Allowance, mailed May 6, 2011.

U.S. Appl. No. 11/562,113, filed Nov. 21, 2006, by Schurig: Office Action, mailed Sep. 10, 2009.

U.S. Appl. No. 11/562,113, filed Nov. 21, 2006, by Schurig: Examiner Interview Summary Record, mailed Jan. 21, 2010.

U.S. Appl. No. 11/562,113, filed Nov. 21, 2006, by Schurig: Office Action, mailed May 28, 2010.

U.S. Appl. No. 11/562,113, filed Nov. 21, 2006, by Schurig: Examiner Interview Summary Record, mailed Oct. 28, 2010.

U.S. Appl. No. 11/562,113, filed Nov. 21, 2006, by Schurig: Office Action, mailed Dec. 9, 2010.

U.S. Appl. No. 11/562,113, filed Nov. 21, 2006, by Schurig: Office Action, mailed May 11, 2011.

PCT International Preliminary Report on Patentability for International Application No. PCT/US2007/084919 mailed on May 26, 2009, 7 pages.

\* cited by examiner

METHODS AND SYSTEMS FOR USING AND UPDATING REMOTELY-GENERATED TRANSLATION PREDICTIONS DURING LOCAL, COMPUTER-AIDED TRANSLATION

FIELD OF THE INVENTION

The present invention relates to methods and systems for providing computer-aided translation. In particular, the present invention relates to methods and systems for local, computer-aided translation using remotely-generated translation predictions.

BACKGROUND OF THE INVENTION

In conventional systems for computer-aided translation, a translation-memory application receives a document in one language (referred to as a source document) for translation into a second, target, language. In these systems, the application typically includes a translation memory that stores an enumeration of phrases, terms, sentences, or other segments of text in the source language with a corresponding translation into the target language for each of the enumerated segments of text. Translation-memory applications may analyze text according to stored rules or algorithms to identify the segments of text in the source document for which the translation memory stores a corresponding translation into the target language.

In some systems, a translation-memory application may provide a client application, executing on a machine used by a translator, and a remote translation memory, residing on a remote server. Typical translation memories may store thousands of translations and require a significant amount of time to identify an appropriate translation for a portion of a source document. The perceptible amounts of time required to process and transmit a translation over a network to a translator creates an inconvenience for typical users. However, insufficient network bandwidth or storage capacity on the machine used by the translator may prevent the translation-memory application from transmitting the translation memory directly to the machine used by the translator.

Methods and systems for providing translators with access over a network to remote translation memories without the delay and inconvenience of conventional systems would be desirable.

BRIEF SUMMARY OF THE INVENTION

In one aspect, a method for local, computer-aided translation using remotely-generated translation predictions includes the step of receiving, by a remote translation memory, at least one portion of a document in a source language for translation into a target language. The remote translation memory determines, prior to receiving from a translator a request for a translation of a second portion of the document, that a translation of the at least one portion of the document is useful in translating the second portion of the document. A local machine receives the translation of the first portion of the document and an identification of the utility of the translation of the first portion of the document to the translation of the second portion of the document. The local machine generates a translation of the second portion of the document through reuse of the translation of the first portion of the document, responsive to the received identification of the utility of the translation of the first portion of the document to the second portion of the document.

In one embodiment, the remote translation receives the at least one portion of the document from a translation agent on the local machine. In another embodiment, the local machine receives an updated version of a translation replacing a previously-received translation.

In another aspect, a system for local, computer-aided translation using remotely-generated translation predictions includes a remote translation memory comprising a first receiver, a remote translation engine, and a transmitter, and a local machine comprising a second receiver and a translation agent. The first receiver receives at least one portion of a document in a source language for translating into a target language. The remote translation engine determines, prior to receiving from a translator a request for a translation of a second portion of the document, that a translation of the at least one portion of the document is useful in translating the second portion of the document. The transmitter transmits the translation of the at least one portion of the document and an identification of the utility of the translation of the first portion of the document to the translation of the second portion of the document.

The second receiver, on the local machine, receives the translation of the first portion of the document and the identification of the utility of the translation of the first portion of the document to the translation of the second portion of the document. The translation agent generates a translation of the second portion of the document, responsive to the received identification of the utility of the translation of the first portion of the document to the second portion of the document.

In one embodiment, the first receiver receives, from the translation agent, at least one portion of a document in a source language for translation into a target language. In another embodiment, the remote translation memory resides on a remote translation server. In still another embodiment, the remote translation engine includes a cache storing one or more translations. In yet another embodiment, the remote translation engine includes a transceiver providing the functionality of a transmitter and a receiver.

In still another aspect, a method for local, computer-aided translation using remotely-generated translation predictions includes the step of receiving, by a remote translation memory, at least one portion of a first document in a source language for translation into a target language. The remote translation memory determines, prior to receiving from a translator a request for a translation of the at least one portion of the first document, that a translation of at least one portion of a second document is useful in translating the at least one portion of the first document. A local machine receives an identification of the utility of the translation of the at least one portion of the second document to the translation of the at least one portion of the first document. The local machine generates a translation of the at least one portion of the first document through reuse of the translation of the at least one portion of the second document, responsive to the received identification of the utility of the translation of the at least one portion of the second document to the translation of the at least one portion of the first document.

In one embodiment, the remote translation memory receives, from the local machine, the at least one portion of the first document in the source language for translation into the target language. In another embodiment, the remote translation memory receives, from the translation agent on the local machine, the at least one portion of the first document in the source language for translation into the target language. In still another embodiment, the local machine stores the received translation in a local cache.

In yet another aspect, a system for local, computer-aided translation using remotely-generated translation predictions includes a remote translation memory comprising a first receiver, a remote translation engine, and a transmitter. The first receiver receives at least one portion of a first document in a source language for translation into a target language. The remote translation engine determines, prior to receiving from a translator a request for a translation of the at least one portion of the first document, that a translation of at least one portion of a second document is useful in translating the at least one portion of the first document. The transmitter transmits the translation of the at least one portion of the first document and an identification of the utility of the translation of the at least one portion of the first document to the translation of the at least one portion of the second document. The system also includes a local machine comprising a second receiver and a translation agent. The second receiver receives the translation of the at least one portion of the first document and the identification of the utility of the translation of the at least one portion of the second document to the translation of the at least one portion of the first document. The translation agent generates a translation of the at least one portion of the first document through reuse of the translation of the at least one portion of the second document, responsive to the received identification of the utility of the translation of the at least one portion of the second document to the translation of the at least one portion of the first document.

In one embodiment, the remote translation memory further comprises a plurality of stored translations. In another embodiment, a plurality of translation agents accesses the remote translation memory. In still another embodiment, the first receiver receives, from the translation agent, the at least one portion of the first document in the source language for translation into the target language.

In one aspect, a method for local, computer-aided translation using remotely-generated translation predictions includes the step of determining that a translation stored in a remote translation memory is useful in translating a first portion of a local document. A local machine receives the translation. The local machine stores, in a local cache, an alternate version of the translation. The alternate version of the translation is identified as useful in translating a second portion of the document. The local machine generates a translation of the second portion of the document through reuse of the alternate version of the translation, responsive to the identification of the utility of the alternate version of the translation in the translation of the second portion of the document.

In one embodiment, a determination is made as to whether an updated version of the translation makes the received translation obsolete. In another embodiment, the remote translation memory receives a request for an updated version of the translation. In still another embodiment, a translator modifies the received translation. In yet another embodiment, the local machine transmits the alternate version of the translation to the remote translation memory.

In another aspect, a system for local, computer-aided translation using remotely-generated translation predictions includes a remote translation server and a local machine. The remote translation server includes a remote translation memory, a remote translation engine, and a transmitter. The local machine comprises a receiver, a local cache, a user interface, and a translation agent. The remote translation memory provides access to a stored translation. The remote translation engine determines that the stored translation is useful in translating a first portion of a document. The transmitter transmits the translation. The receiver receives the translation of the first portion of the document. The local cache stores the translation of the first portion in a cache. The user interface receives from a translator an alternate version of the translation of the first portion of the document. The translation agent identifies the alternate version of the translation of the first portion of the document as useful in the translation of a second portion of the document and generates a translation of the second portion of the document through reuse of the alternate version of the translation of the first portion of the document, responsive to the identification of the utility of the alternate version translation of the first portion of the document in the translation of the second portion of the document.

In one embodiment, the remote translation memory stores a plurality of translations. In another embodiment, the translation agent further comprises a means for determining whether an updated version of the translation makes the received translation obsolete. In still another embodiment, the receiver receives, from a translator, a modification to the received translation. In yet another embodiment, the local machine further comprises a transmitter sending, to the remote translation server, the alternate version of the translation.

In still another aspect, a method for local, computer-aided translation using remotely-generated translation predictions includes the step of determining that a translation stored in a remote translation memory is useful in translating a first portion of a local document. A local machine receives the translation. A determination is made, prior to receiving from a translator a request for the translation, that the remote translation memory stores an updated version of the translation. The updated version of the translation is identified as useful in translating a second portion of the document. The local machine generates a translation of the second portion of the document through reuse of the updated version of the translation, responsive to the identification of the utility of the updated version of the translation in translating the second portion of the document.

In one embodiment, a determination is made that the updated version of the translation makes the received translation obsolete. In another embodiment, the remote translation memory transmits an indication that the remote translation memory stores an updated version of the translation. In still another embodiment, the remote translation memory receives a request for the updated version of the translation. In yet another embodiment, a translator modifies the updated version of the translation.

In yet another aspect, a system for local, computer-aided translation using remotely-generated translation prediction includes a remote translation server and a local machine. The remote translation server includes a remote translation memory, a remote translation engine, and a transmitter. The remote translation memory provides access to a stored translation. The remote translation engine determines that a translation stored in a remote translation memory is useful in translating a first portion of the document. The transmitter transmits the stored translation. The local machine includes a receiver and a translation agent. The receiver receives the translation of the first portion of the document. The translation agent determines, prior to receiving from a translator a request for the translation, that the remote translation memory stores an updated version of the translation, identifies the updated version of the translation as useful in translating a second portion of the document, and generates a translation of the second portion of the document through reuse of the updated version of the translation, responsive to the identification of the utility of the updated version of the translation of the first portion of the document in translating the second portion of the document.

In one embodiment, the remote translation memory stores a plurality of translations. In another embodiment, the remote translation server further comprises a receiver for receiving from a local machine a modification to a translation stored in a remote translation memory on the remote translation server. In still another embodiment, the local machine further comprises a means for determining that the updated version of the translation makes the received translation obsolete. In some embodiments, the receiver on the local machine receives from a translator, a modification to the received translation. In one of these embodiments, the local machine further comprises a transmitter sending, to the remote translation server, the alternate version of the translation.

BRIEF DESCRIPTION OF THE DRAWINGS

The foregoing and other objects, aspects, features, and advantages of the invention will become more apparent and better understood by referring to the following description taken in conjunction with the accompanying drawings, in which.

DETAILED DESCRIPTION OF THE INVENTION

Figure 1A:
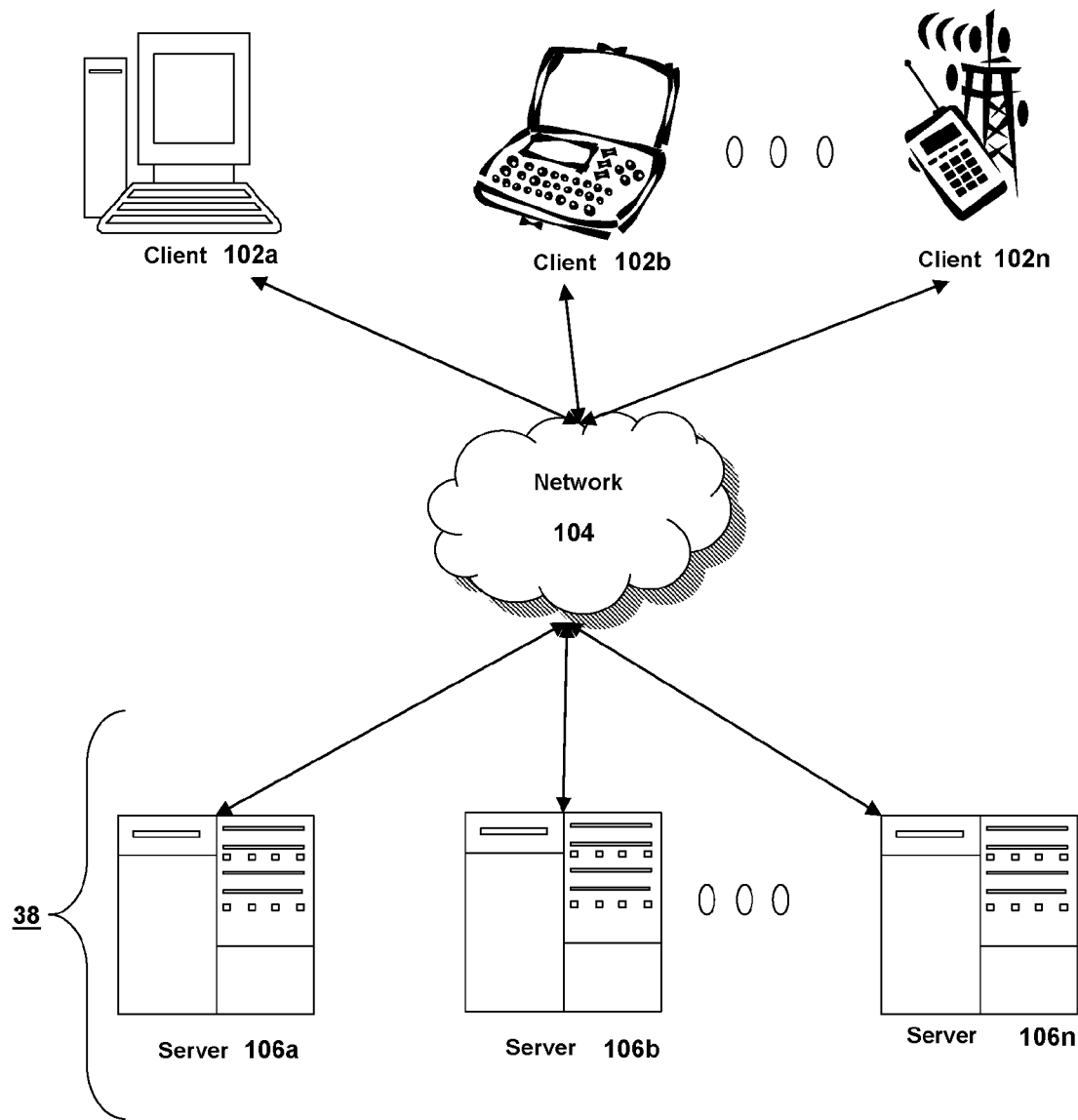
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104.

The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the servers 106 may be geographically dispersed from each other or from the clients 102. The servers 106 and the clients 102 may be heterogeneous. One or more of the servers 106 or clients 102 can operate according to one type of operating system platform (e.g., WINDOWS XP, manufactured by Microsoft Corp. of Redmond, Wash.), while one or more of the other servers 106 or clients 102 can operate on according to another type of operating system platform (e.g., Unix or Linux). The clients 102 and the servers 106 may be interconnected using a wide-area network (WAN) connection or a metropolitan-area network (MAN) connection. Data transmission speeds between servers 106 and clients 102 can be increased if the servers 106 and the clients 102 are connected using a local-area network (LAN) connection or some form of direct connection.

A server 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes, client machines, endpoint nodes, or endpoints. In some embodiments, a client 102 has the capacity to function as both a client node seeking access to resources provided by a server and as a server providing access to hosted resources for other clients 102a-102n.

In some embodiments, a client 102 communicates with a server 106. In one embodiment, the client 102 communicates directly with one of the servers 106. In another embodiment, the client 102 communicates with a server 106 through a network 104. Over the network 104, the client 102 can, for example, request access to resources hosted by the servers 106a-106n. In other embodiments, a client 102a communicates with a client 102b. In one of these embodiments, the client 102a communicates directly with one of the clients 102. In another of these embodiments, the client 102a communicates with the client 102b through a network 104.

In one embodiment, the server 106 provides functionality of a web or Internet server, or a desktop sharing server, or a collaboration server. In another embodiment, the server 106a receives requests from the client 102 and responds to the requests. In still another embodiment, the server 106a receives requests from the client 102, forwards the requests to a second server 106b and responds to the request by the client 102 with a response to the request from the server 106b.

A client 102 may execute, operate or otherwise provide an application, which can be any type and/or form of software, program, or executable instructions such as any type and/or form of web browser, web-based client, client-server application, an ActiveX control, or a Java applet, or any other type and/or form of executable instructions capable of executing on client 102. The application can use any type of protocol and it can be, for example, an HTTP client, an FTP client, an Oscar client, or a Telnet client. In one embodiment, the application comprises any type of software related to voice over internet protocol (VoIP) communications, such as a soft IP telephone. In another embodiment, the application comprises any application related to real-time data communications, such as applications for streaming video and/or audio.

Figure 1B:
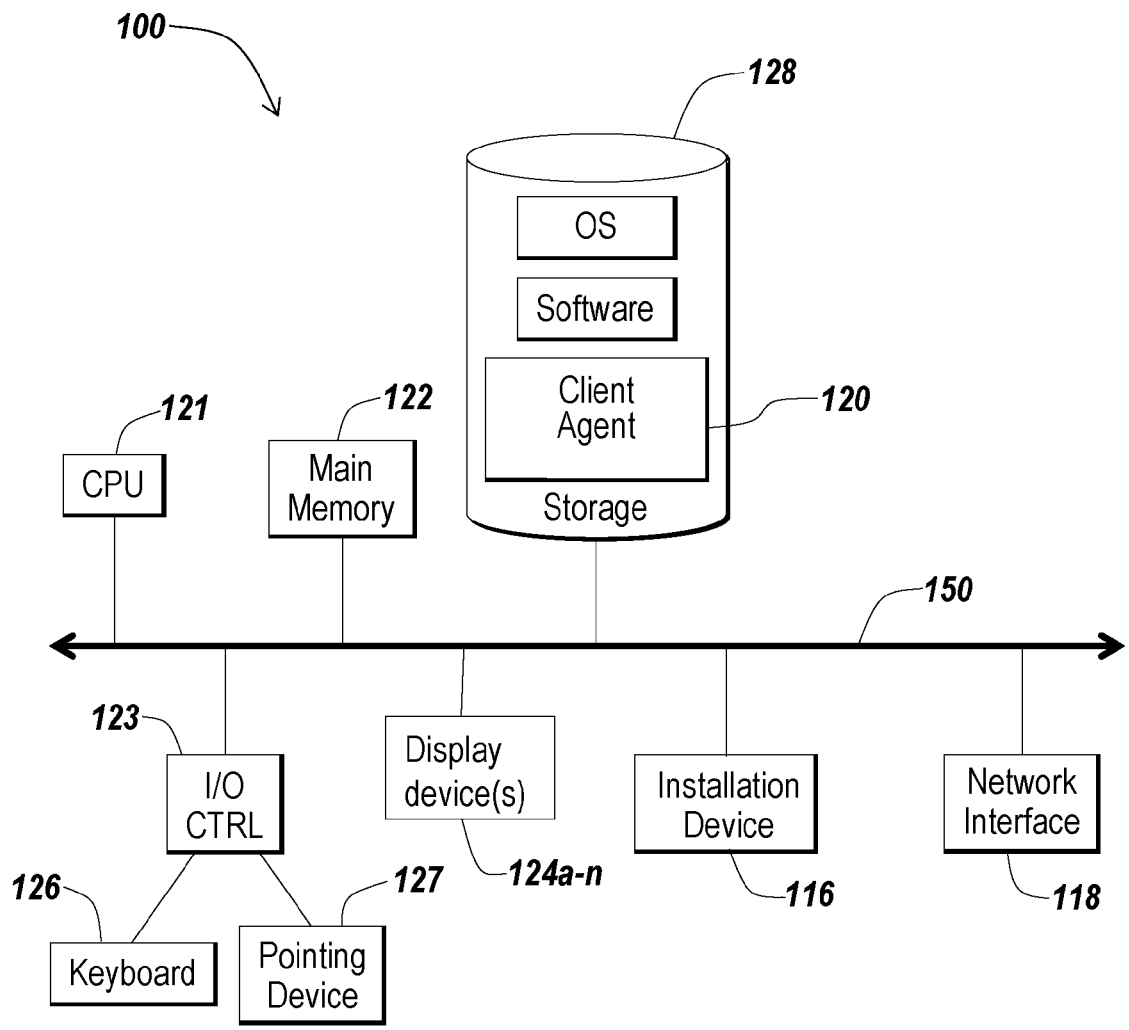
FIG. 1B is a block diagram depicting an embodiment of a computer useful in connection with the methods and systems described herein.

The client 102 and server 106 may be deployed as and/or executed on any type and form of computing device, such as a computer, network device or appliance capable of communicating on any type and form of network and performing the operations described herein. FIG. 1B depicts a block diagram of a computing device 100 useful for practicing an embodiment of the client 102 or a server 106. As shown in FIG. 1B, each computing device 100 includes a central processing unit 121, and a main memory unit 122. As shown in FIG. 1B, a computing device 100 may include a visual display device 124, a keyboard 126 and/or a pointing device 127, such as a mouse.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

The computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIG. 1B typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system provided by Red Hat of Raleigh, N.C., or any type and/or form of a Unix operating system, among others.

In some embodiments, the computing device 100 may have different processors, operating systems, and input devices consistent with the device. For example, in one embodiment the computing device 100 is a Treo 180, 270, 600, 650, 680, 700p or 700w smart phone manufactured by Palm, Inc. In some of these embodiments, the Treo smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 2:
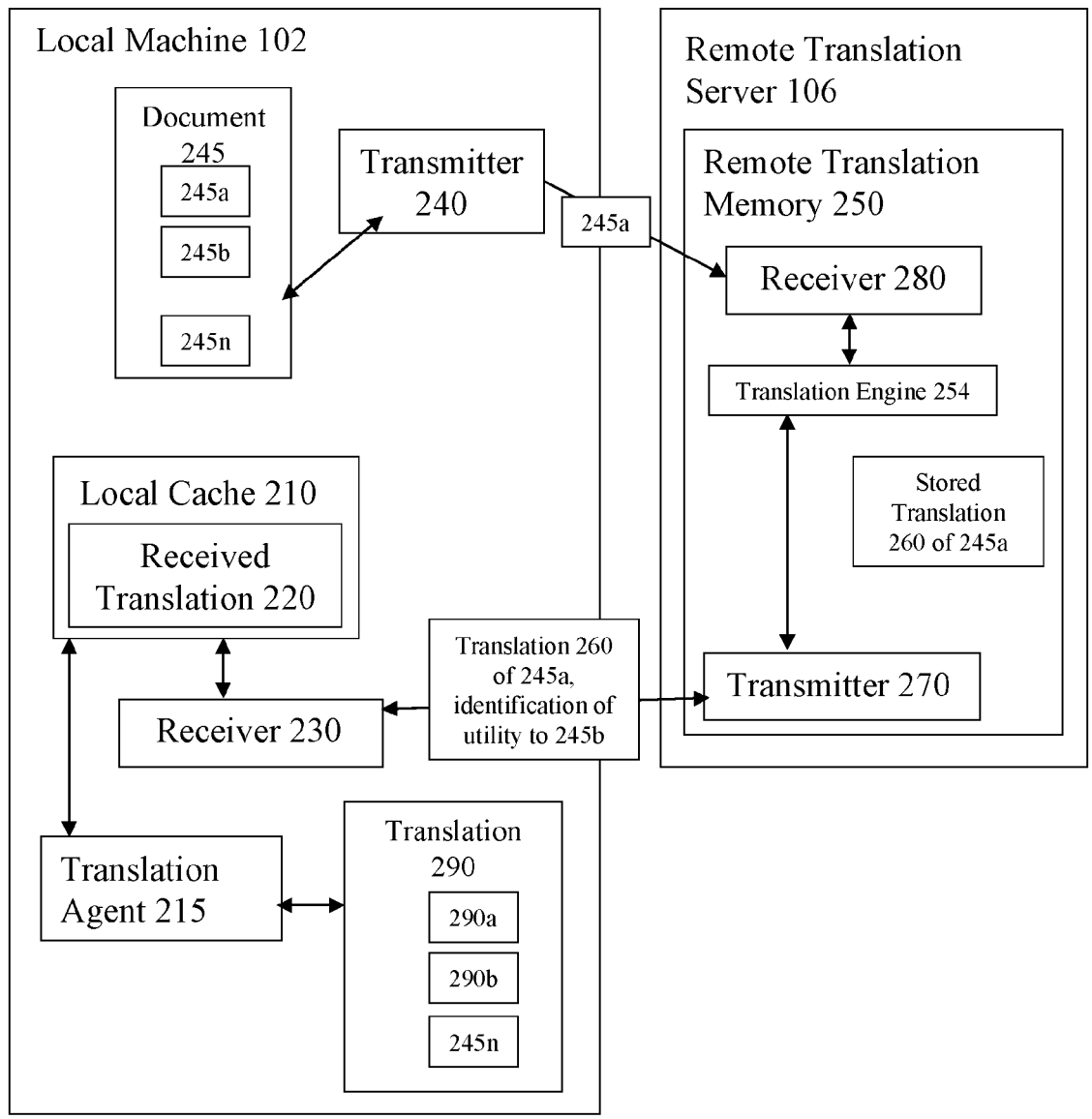
FIG. 2 is a block diagram depicting one embodiment of a system for local, computer-aided translation using remotely-generated translation predictions.

Referring now to FIG. 2, a block diagram depicts one embodiment of a system for local, computer-aided translation using remotely-generated translation predictions. The system includes a remote translation server 106 and a local machine 102. In brief overview, a remote translation memory 250 on the remote translation server 106 receives at least one portion 245a of a document 245 in a source language for translation into a target language. The remote translation memory 250 determines, prior to receiving from a translator a request for a translation of a second portion 245b of the document 245, that a translation 260 of the at least one portion 245a of the document 245 is useful in translating the second portion 245b of the document 245. The local machine 102 receives the translation 260 of the first portion 245a of the document 245 and receives an identification of the utility of the translation 260 of the first portion 245a of the document 245 to the translation of the second portion 245b of the document 245. The local machine 102 generates a translation 290b of the second portion 245b of the document 245 through reuse of the translation 260 of the first portion 245a of the document 245, responsive to the received identification of the utility of the translation 260 of the first portion 245a of the document 245 to the second portion 245b of the document 245.

Referring now to FIG. 2, and in greater detail, the remote translation memory 250 provides access to a stored translation 260. In one embodiment, the remote translation server 106 is a server 106 as described above in connection with FIGS. 1A and 1B. In another embodiment, the remote translation memory 250 resides on the remote translation server 106. In still another embodiment, the remote translation memory 250 is in communication with the remote translation server 106.

In one embodiment, the remote translation memory 250 stores a plurality of stored translations. In another embodiment, the remote translation memory 250 further comprises a local cache storing a translation. In still another embodiment, the remote translation memory 250 is in communication with a cache storing a translation.

In some embodiments, a plurality of local machines accesses the remote translation memory 250. In one of the embodiments, the plurality of local machines accesses the remote translation memory 250 to request a translation of a portion of a document. In another of these embodiments, the plurality of local machines accesses the remote translation memory 250 to modify a stored translation on the remote translation memory 250. In still another of these embodiments, the plurality of local machines access the remote translation memory 250 to add a translation to the remote translation memory 250.

The remote translation memory 250 comprises a first receiver 280. The receiver 280 receives at least one portion 245a of a document 245 in a source language for translation into a target language. In one embodiment, the receiver 280 receives the request from the local machine 102. In another embodiment, the receiver 280 receives the request from a translation agent 215 on the local machine 102.

In one embodiment, the receiver 280 receives a request for the translation 260. In still another embodiment, the receiver 280 receives a request, from a local machine 102, for a translation of a first portion 245a of a local document 245. In still another embodiment, the receiver 280 receives requests for the translation 260 or for a translation of a portion of a local document 245 from one or more local machines 102.

The remote translation memory 250 comprises a remote translation engine 254. The remote translation engine 254 determines, prior to receiving from a translator a request for a translation of a second portion 245b of the document 245, that a translation 260 of the at least one portion 245a of the document 245 is useful in translation the second portion 245b of the document 245. In some embodiments, the remote translation memory 250 receives at least one portion of a first document prior to receiving from a translator a request for a translation of the at least one portion of the first document. In other embodiments, the remote translation memory 250 receives a first portion of a first document and completes a process of identifying a translation for the first portion before receiving a request for a translation of a second portion of the first document. In still other embodiments, the remote translation memory 250 receives a portion of a first document and a portion of a second document. In one of these embodiments, the remote translation memory 250 completes a process of identifying a translation for the portion of the first document and of identifying the utility of the translation of the portion of the first document to a translation of the portion of the second document prior to receiving from a translator a request for a translation of the portion of the second document.

In one embodiment, the remote translation engine 254 makes the determination upon receiving a request for the translation from the translation agent 215. In another embodiment, the translation agent 215 makes the request for the translation prior to receiving a request for the translation from a translator. In still another embodiment, the translation agent 215 monitors a translator translating a first portion 245a of the document 245. In yet another embodiment, the translation agent 215 identifies the second portion 245b and makes a request to the remote translation memory 250 for a translation of the section 245b while the translator translates, or edits a translation of, the first portion 245a of the document 245.

In one embodiment, the receiver 280 receives, from the local machine 102, a modification to a translation 260 stored in the remote translation memory 250. In another embodiment, the receiver 280 receives, from the local machine, an updated version of a translation 260 stored in the remote translation memory 250. In still another embodiment, the remote translation engine 254 comprises a means for determining that the updated version of the translation 260 of the at least one portion 245a of the document 245 is useful in translating the second portion 245b of the document 245.

The remote translation memory 250 comprises a transmitter 270. The transmitter 270 transmits the translation 260 of the first portion 245a of the document 245 and transmits an identification of the utility of the translation 260 of the at least one portion 245a of the document 245 to the translation of the second portion 245b of the document 245. In one embodiment, the transmitter 270 accesses the remote translation memory 250 to send the translation 260 to the local machine 102. In another embodiment, the transmitter 270 receives, from the remote translation engine 254, an identification of the translation 260 to transmit to the local machine 102. In still another embodiment the transmitter 270 resides in the remote translation memory 250.

The local machine 102 comprises a second receiver 230. The second receiver 230 receives the translation 260 of the first portion 245a of the document 245 and the identification of the utility of the translation 260 of the first portion 245a of the document 245 to the translation of the second portion 245b of the document 245.

In one embodiment, the local machine 102 further comprises a local cache 210 storing the translation 260 as received translation 220. In another embodiment, the local machine 102 is in communication with a cache storing the translation 260 as received translation 220.

In one embodiment, the local machine 102 further comprises a receiver 230 receiving a revision to a received translation 220. In another embodiment, the receiver 230 receives the revision from the remote translation server 106. In still another embodiment, the receiver 230 receives the revision from a user of the local machine 102, such as a translator.

In one embodiment, the local machine 102 further comprises a transmitter 240 transmitting a portion 245a to the remote translation server 106 for translation from a source language to a target language. In another embodiment, the transmitter 240 transmits a portion 245a to the remote translation memory 250 for translation from a source language to a target language. In still another embodiment, the transmitter 240 transmits a request for a translation 260. In yet another embodiment, the transmitter 240 transmits a modified version of a received translation 220 to the remote translation server 250. In some embodiments, the local machine 102 comprises a transceiver combining the functionality of the receiver 230 and the transmitter 240.

The local machine 102 comprises a translation agent 215. The translation agent 215 generates a translation 290b of the second portion 245b of the document 245 through reuse of the translation 260 of the first portion 245a of the document 245, responsive to the received identification of the utility of the translation 260 of the first portion 245a of the document 245 to the second portion 245b of the document 245. In some embodiments, the translation agent 215 comprises a client-side software application program. In other embodiments, the translation agent 215 is embedded into, or associated with, an application program on the local machine. In one of these embodiments, the translation agent 215 is provided as a dynamically linked library. In another of these embodiments, the translation agent 215 is provided as a plug-in component of an application program executing on the local machine.

In some embodiments, the translation agent 215 is in communication with the remote translation memory 250. In one of these embodiments, the translation agent 215 identifies one or more portions—such as sentences, words, or phrases—in a document in a source language for translation into a target language. In another of these embodiments, the translation agent 215 transmits a request to the remote translation memory 250 for a translation of a portion of a document. In still another of these embodiments, the translation agent 215 transmits the request to the remote translation memory 250 while a translator views, edits or completes a translation of a second portion of the document. In yet another of these embodiments, the translation agent 215 displays the received translation to the translator.

Figure 3:
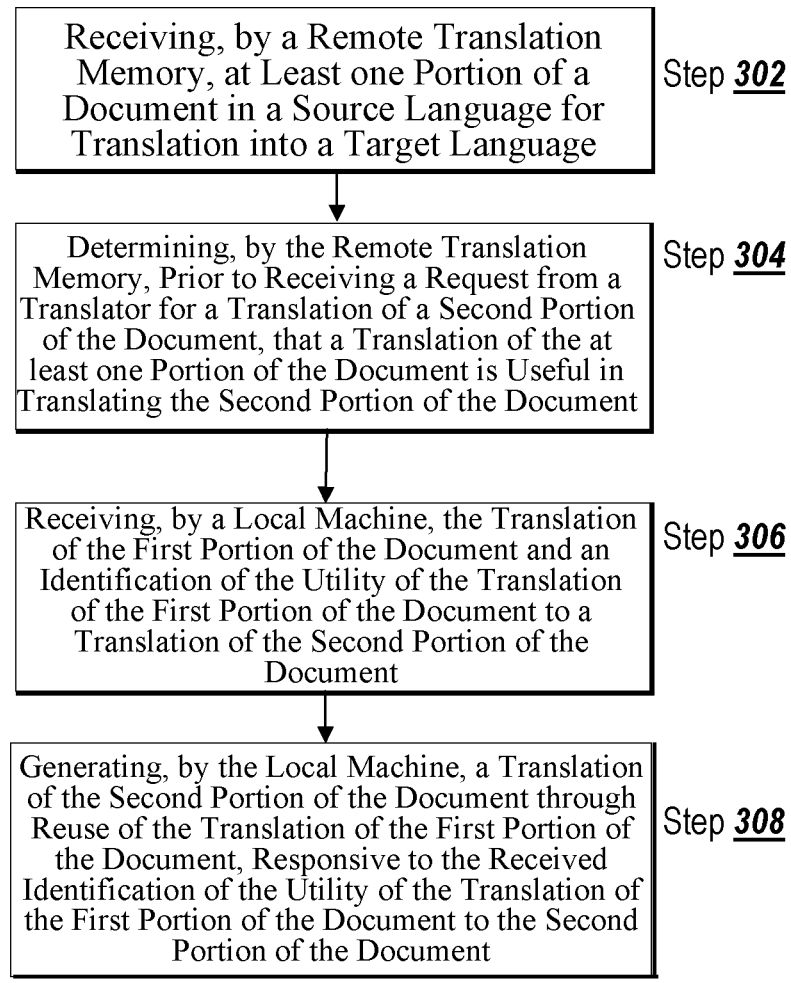
FIG. 3 is a flow diagram depicting one embodiment of the steps taken in a method for local, computer-aided translation using remotely-generated translation predictions.

Referring now to FIG. 3, a flow diagram depicts one embodiment of the steps taken in a method for local, computer-aided translation using remotely-generated translation predictions. In brief overview, a remote translation memory receives at least one portion of a document in a source language for translation into a target language (step 302). The remote translation memory determines, prior to receiving from a translator a request for a translation of a second portion of the document, that a translation of the at least one portion of the document is useful in translating the second portion of the document (step 304). A local machine receives the translation of the first portion of the document and an identification of the utility of the translation of the first portion of the document to a translation of the second portion of the document (step 306). The local machine generates a translation of the second portion of the document through reuse of the translation of the first portion of the document, responsive to the received identification of the utility of the translation of the first portion of the document to the second portion of the document (step 308).

In some embodiments, the document 245 comprises a plurality of portions 245a-245n. In one of these embodiments, a portion of a document comprises a word, a phrase, a term, a portion of a sentence, an entire sentence, a portion of a paragraph, or an entire paragraph. In another of these embodiments, a user, such as a translator, requests a translation of the document 245, which may be referred to as a source document. In still another of these embodiments, the translator identifies a target language into which the translator requests translation of the source document 245.

In some embodiments, a translator requests, from a local machine 102, a translation of an entire document. In one of these embodiments, the local machine 102 begins translating portions of the document. In another of these embodiments, the local machine 102 translates a first portion of the document using a translation 220 stored in the local cache and previously received from the remote translation server 106 as translation 260. In still another of these embodiments, the local machine 102 requests a translation 260 from the remote translation server 106 when the local machine 102 determines that the local cache does not store a translation 260 useful for translating a portion of the source document 245.

In these embodiments, the use of a locally stored translation 220 by the local machine 102 decreases a lag time, or delay, experienced by the translator between a time at which the translator requests a translation and the time at which the translator receives the translation. In one embodiment, the use of a locally stored translation 220 enables the translator to translate portions of documents regardless of whether the translator has access to the remote translation memory 250 at the time of the translation. Furthermore, since the stored translation 220 has applicability to at least one portion of the document for which the translator requests translation, in one embodiment, the local cache 210 stores translations likely to have utility to the translation of the documents, and portions of documents, on which the translator works.

Referring now to FIG. 3, and in greater detail, a remote translation memory receives at least one portion of a document in a source language for translation into a target language (step 302). In one embodiment, the remote translation memory 250 receives, from the local machine 102, at least one portion of a document in a source language for translation into a target language. In another embodiment, the remote translation memory 250 receives, from a translation agent on the local machine 102, at least one portion of a document in a source language for translation into a target language. In still another embodiment, the remote translation memory 250 receives, from the local machine 102, an updated version of a translation replaced a stored translation 260. In yet another embodiment, the remote translation memory 250 determines that the updated version of the translation of the at least one portion of the document is useful in translating a second portion of the document.

The remote translation memory determines, prior to receiving from a translator a request for a translation of a second portion of the document, that a translation of the at least one portion of the document is useful in translating the second portion of the document (step 304). In some embodiments, the remote translation memory 250 includes a means for determining that a translation 260 is useful in translating a first portion of a document 245. In one of these embodiments, the means for determining the utility of a translation 260 comprises a database. In another of these embodiments, the means for determining the utility of a translation 260 comprises a table.

In one embodiment, the means for determining the utility of a translation 260 includes an enumeration of the translation 260 and a phrase associated with the translation 260. In another embodiment, the means for determining the utility of a translation 260 determines that the document 245 includes the phrase associated with the translation 260. In still another embodiment, the means for determining the utility of a translation 260 determines that the local machine 102 may use the translation 260 to translate the identified phrase associated with the translation 260 responsive to the determination the document 245 includes the identified phrase.

In some embodiments, the remote translation memory 250 performs a search for a portion of a document 245 in a database, such as a translation memory. In one of these embodiments, the remote translation memory 250 performs a fuzzy search for a portion of a document 245 in a database, such as a translation memory. In another of these embodiments, the remote translation memory 250 performs an exact search for a portion of a document 245 in a database, such as a translation memory. In still another of these embodiments, the portion of the document is a segment, such as a sentence or part of speech. In yet another of these embodiments, the remote translation memory 250 finds the portion of the document in the translation memory database and identifies one or more translations associated with the portion of the document in the database. In other embodiments, the remote translation memory 250 transmits an enumeration of identified, associated translations. In one of these embodiments, the remote translation memory 250 transmits the one or more translations 260. In another of these embodiments, the enumeration of associated translations includes a ranking by relevance of the translation to the translator, ranked by relevance. In still another of these embodiments, the ranking is based on a type of match made between the translation and the portion of the document. In yet another of these embodiments, types of matching include, but are not limited to, exact matching, fuzzy matching, and a similarity between new text and text already translated in the translation memory.

A local machine receives the translation of the first portion of the document and an identification of the utility of the translation of the first portion of the document to a translation of the second portion of the document (step 306). In one embodiment, the local machine 102 stores the received translation. In another embodiment, the local machine 102, stores the received translation in a local cache 210. In still another embodiment, the local machine 102 receives a revision to a received translation 220. In some embodiments, and as described in greater detail below in connection with FIG. 8 and FIG. 9, the local machine 102 determines whether the remote translation memory 250 stores an updated version of the received translation 220. In one of these embodiments, the local machine 102 uses the updated version of the received translation.

The local machine generates a translation of the second portion of the document through reuse of the translation of the first portion of the document, responsive to the received identification of the utility of the translation of the first portion of the document to the second portion of the document (step 308). In one embodiment, the local machine 102 includes an application program that receives the translation 260, stores the translation 260 in the local cache as received translation 220, and generates a translation 290 of at least one portion 245a of the document 245 using the received translation 220.

In some embodiments, the local machine 102 generates a translation of the second portion 245b of the document 245 by replacing the second portion 245b of the document 245 with the received translation 220. In one of these embodiments, the translation agent 215 on the local machine 102 generates the translation. In other embodiments, the translation agent 215 displays the translation to a translator. In one of these embodiments, the translation agent 215 displays, via a user interface, the translation to the translator. In another of these embodiments, the translation agent 215 displays, via an application program on the local machine 102, the translation of the second portion of the document 645. In still other embodiments, the translator approves, rejects, or modifies the translation.

In one embodiment, the local machine 102 displays the translation of the second portion of the document 245 to a translator. In another embodiment, and as discussed in greater detail below in connection with FIG. 6 and FIG. 7, the local machine 102 receives alternate versions of the translation 220 from the translator responsive to a review of the translation of the second portion of the document 245. In some embodiments, the local machine 102 generates a translation of a third portion 245c of the document 245 through reuse of the alternate version of the translation 220.

Figure 4:
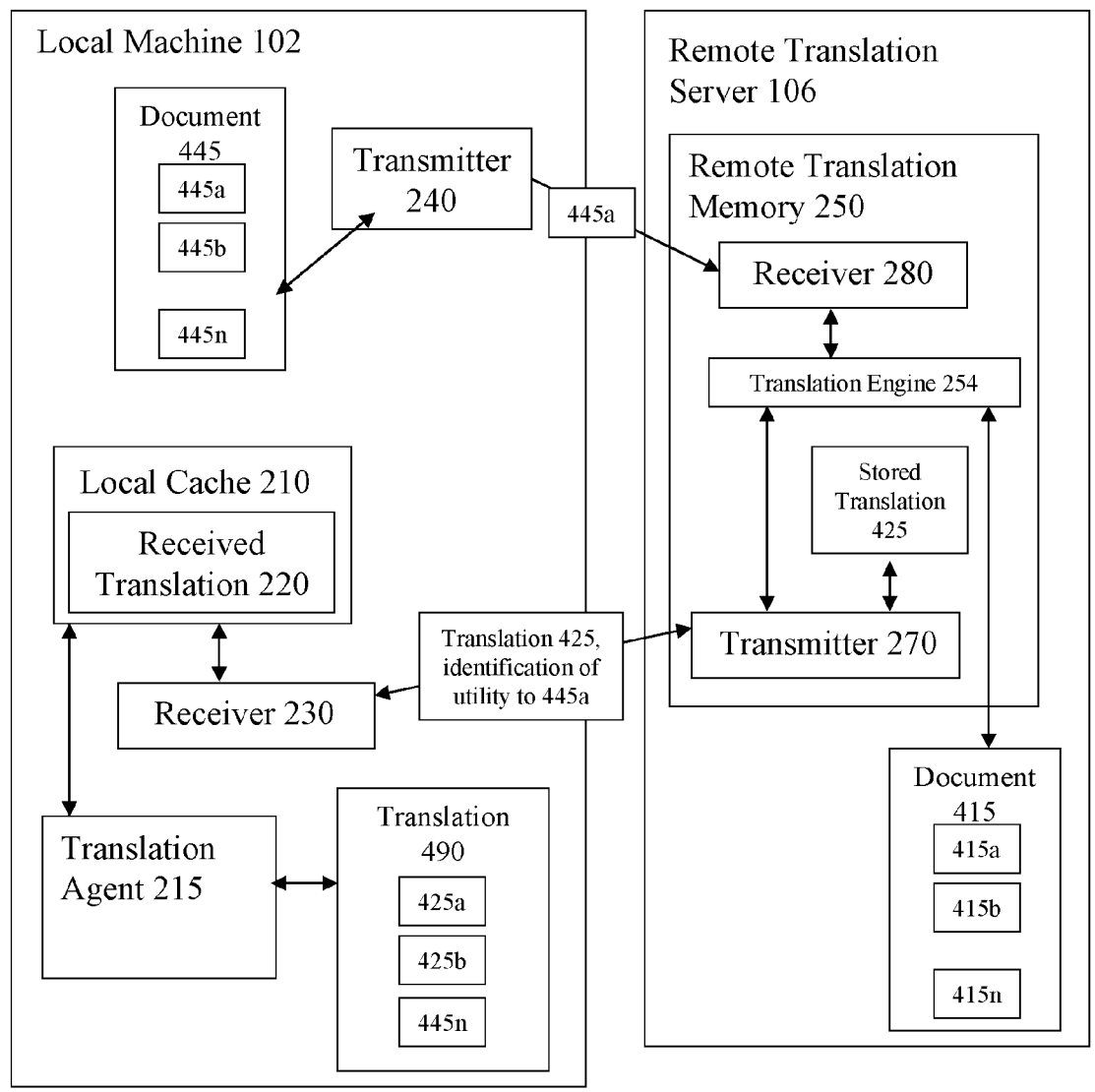
FIG. 4 is a block diagram depicting another embodiment of a system for reusing remotely-generated translations across a plurality of documents.

Referring now to FIG. 4, a block diagram depicts one embodiment of a system for reusing remotely-generated translations across a plurality of documents. In brief overview, the remote translation memory comprises a first receiver 280, a remote translation engine 254, and a transmitter 270. The first receiver 280 receives at least one portion 445a of a first document 445 in a source language for translation into a target language. The remote translation engine 254 determines, prior to receiving from a translator a request for a translation of the at least one portion 445a of the first document 445, that a translation 425 of at least one portion 415a of a second document 415 is useful in translating the at least one portion 445a of the first document 445. The transmitter transmits a translation 425 of the at least one portion 415a of the second document 415 and transmits an identification of the utility of the translation 425 of the at least one portion 415a of the second document 415 to the translation of the at least one portion of 445a of the first document 445. A local machine 102 comprises a second receiver 230 and a translation agent 215. The second receiver 230 receives the translation 425 of the at least one portion 415a of the first document 415 and the identification of the utility of the translation 425 to the translation of the at least one portion 445a of the first document 445. The translation agent 215 generates a translation 490 of the at least one portion 445a of the first document 445 through reuse of the translation 425 of the at least one portion 415a of the second document 415, responsive to the received identification of the utility of the translation 425 to the translation of the at least one portion 445a of the first document 445.

Referring now to FIG. 4, and in greater detail, in some embodiments, the remote translation server 106 and the local machine 102 include the components and provide the functionality of the remote translation server 106 and the local machine 102 described in connection with FIG. 2 and FIG. 3. The receiver 280 receives at least one portion 445a of a first document 445 in a source language for translation into a target language. In one embodiment, the receiver 280 receives the at least one portion 445a of the first document 445 from the local machine 102. In another embodiment, the receiver 280 receives the at least one portion 445a of the first document 445 from a transmitter 240 on the local machine 102. In still another embodiment, the receiver 280 receives the at least one portion 445a of the first document 445 from the translation agent 215 on the local machine.

In one embodiment, the receiver 280 receives, from the local machine 102, a modification to a translation 425 stored by the remote translation memory 250. In another embodiment, the receiver 280 receives an updated version of a translation 425 stored by the remote translation memory 250. In still another embodiment, the receiver 280 receives a new translation to store in the remote translation memory 250. In yet another embodiment, the remote translation engine 254 includes a means for determining that a new, updated, or modified version of a translation 425 received from the local machine 102 is useful in translating at least one portion of the document 445.

In one embodiment, the remote translation memory 250 resides on a remote translation server 106. In another embodiment, the remote translation memory 250 is in communication with a remote translation server 106. In still another embodiment, the remote translation memory 250 further comprises a location cache storing translations 425. In yet another embodiment, the remote translation memory 250 is in communication with a local cache storing a translation 425.

In one embodiment, the remote translation memory 250 stores a plurality of translations. In another embodiment, a plurality of local machines 102 accesses the remote translation memory 250. In still another embodiment, the receiver 280 receives, from one or more local machines 102, requests for a translation of at least one portion of a local document 445.

The remote translation engine 254 determines, prior to receiving from a translator a request for a translation of the at least one portion 445a of the first document 445, that a translation of at least one portion 415a of a second document 415 is useful in translating the at least one portion 445a of the first document 445. In some embodiments, the remote translation memory stores the at least one portion 415a of the second document 415. In other embodiments, and as depicted in FIG. 4, the remote translation server stores the second document 415. In still other embodiments, a second remote translation memory 250 on the remote translation server 106 stores the at least one portion 415a. In one of these embodiments, the second remote translation memory 250 on the remote translation server 106 stores the second document 415. In even still other embodiments, a second remote translation server 106b stores the at least one portion 415a. In one of these embodiments, the second remote translation server 106b stores the second document 415. In another of these embodiments, a second remote translation memory 250' on the second remote translation server 106b stores the at least one portion 415a. In still another of these embodiments, a second remote translation memory 250' on the second remote translation server 106b stores the second document 415.

The transmitter transmits a translation 425 of the at least one portion 415a of the second document 415 and transmits an identification of the utility of the translation 425 of the at least one portion 415a of the second document 415 to the translation of the at least one portion of 445a of the first document 445. In some embodiments, the transmitter receives an identification of a translation 425 to transmit from the remote translation engine 254. In other embodiments, the transmitter receives the identification of the utility of the translation 425 of the at least one portion 415a of the second document 415 to the translation of the at least one portion of 445a of the first document 445 from the remote translation engine 254.

In some embodiments, the remote translation memory 250 includes a transceiver combining the functionality of the receiver 280 and the transmitter 270. In other embodiments, the remote translation engine 254 includes a transceiver combining the functionality of the receiver 280 and the transmitter 270. In still other embodiments, a remote translation server 106 includes a transceiver combining the functionality of the receiver 280 and the transmitter 270.

A local machine 102 comprises a second receiver 230 and a translation agent 215. In some embodiments, the local machine 102 includes a receiver 230 receiving a revision to a received translation 425. In other embodiments, the local machine 102 includes a transmitter 240 sending, to the remote translation memory 250, a modified version of a received translation. In still other embodiments, the translation agent 215 on the local machine 102 comprises the receiver 230 and the transmitter 240.

The second receiver 230 receives the translation 425 of the at least one portion 415a of the first document 415 and the identification of the utility of the translation 425 to the translation of the at least one portion 445a of the first document 445. The translation agent 215 generates a translation 490 of the at least one portion 445a of the first document 445 through reuse of the translation 425 of the at least one portion 415a of the second document 415, responsive to the received identification of the utility of the translation 425 to the translation of the at least one portion 445a of the first document 445.

Figure 5:
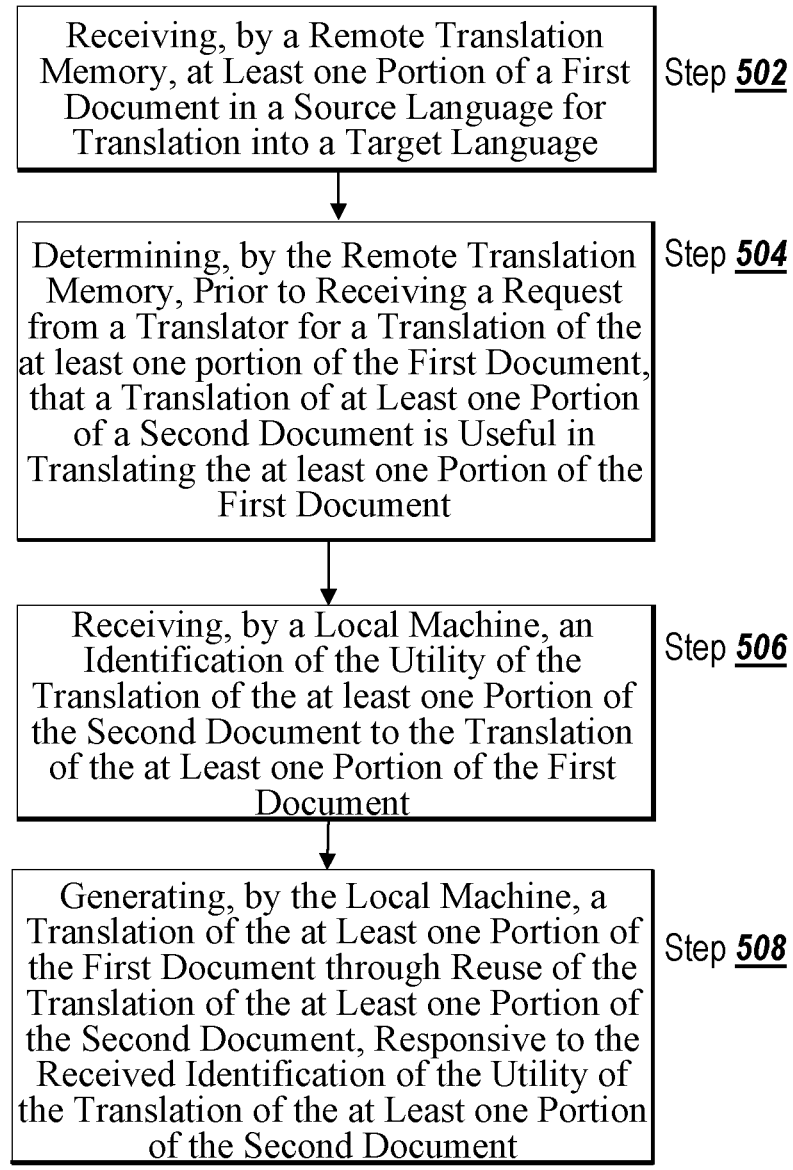
FIG. 5 is a flow diagram depicting another embodiment of the steps taken in a method for reusing remotely-generated translations across a plurality of documents.

Referring now to FIG. 5, a flow diagram depicts one embodiment of the steps taken in a method for local, computer-aided translation incorporating translator revisions to remotely-generated translation predictions. A remote translation memory receives at least one portion of a first document in a source language for translation into a target language (step 502). The remote translation memory determines, prior to receiving from a translator a request for a translation of the at least one portion of the first document, that a translation of at least one portion of a second document is useful in translating the at least one portion of the first document (steps 504). A local machine receives an identification of the utility of the translation of the at least one portion of the second document to the translation of the at least one portion of the first document (step 506). The local machine generates a translation of the at least one portion of the first document through reuse of the translation of the at least one portion of the second document, responsive to the received identification of the utility of the translation of the at least one portion of the second document to the translation of the at least one portion of the first document (step 508).

Referring now to FIG. 5 and in greater detail, a remote translation memory receives at least one portion of a first document in a source language for translation into a target language (step 502). In one embodiment, the remote translation memory 250 receives, from a local machine 102, the at least one portion 445a of the first document 445 in the source language, for translation into the target language. In another embodiment, the remote translation memory 250 receives, from a translation agent 215 on the local machine 102, the at least one portion 445a of the first document 445 in the source language, for translation into the target language.

In one embodiment, the remote translation memory 250 receives, from a local machine 102, an updated version of a translation replacing a translation 425 stored by the remote translation memory 250. In another embodiment, the remote translation memory 250 receives, from a local machine 102, a modification to a translation 425 stored by the remote translation memory 250. In still another embodiment, the remote translation memory 250 receives, from a local machine 102, an additional translation 425' to store. In yet another embodiment, the remote translation memory 250 determines that an updated version of the translation 425 is useful translating the at least one portion 445a of the first document 445. In some embodiments, the remote translation engine 254 determines that a modified translation, revised replacement translation, or additional translation is useful in the translation of at least one portion of a document.

The remote translation memory determines, prior to receiving from a translator a request for a translation of the at least one portion of the first document, that a translation of at least one portion of a second document is useful in translating the at least one portion of the first document (steps 504). In some embodiments, the remote translation memory 250 receives at least one portion of a first document prior to receiving from a translator a request for a translation of the at least one portion of the first document. In other embodiments, the remote translation memory 250 receives a first portion of a first document and completes a process of identifying a translation for the first portion before receiving a request for a translation of a second portion of the first document. In still other embodiments, the remote translation memory 250 receives a portion of a first document and a portion of a second document. In one of these embodiments, the remote translation memory 250 completes a process of identifying a translation for the portion of the first document and of identifying the utility of the translation of the portion of the first document to a translation of the portion of the second document prior to receiving from a translator a request for a translation of the portion of the second document. In yet other embodiments, the translation agent 215 transmits a request for a translation of a portion of the first document while a translator using the local machine 102 modifies, edits, or completes a translation of a second, previous portion of the first document.

A local machine receives an identification of the utility of the translation of the at least one portion of the second document to the translation of the at least one portion of the first document (step 506). In one embodiment, the local machine 102 receives a revision to a received translation 220. In another embodiment, the local machine 102 stores the revision to the received translation 220 without replacing the received translation 220. In still another embodiment, the local machine 102 replaces the received translation 220 with the revision to the received translation 220. In yet another embodiment, the local machine stores received translations in a local cache.

The local machine generates a translation of the at least one portion of the first document through reuse of the translation of the at least one portion of the second document, responsive to the received identification of the utility of the translation of the at least one portion of the second document to the translation of the at least one portion of the first document (step 508). In one embodiment, the translation agent 215 generates the translation.

In some embodiments, as described above in connection with FIG. 2 and FIG. 3, a translation of a portion of a document may be reused to translate a second portion within the same document. In one of these embodiments, a translation of a portion of a first document may also have utility in translating a portion of a second document. Additionally, in some embodiments, even if a translation of a portion of a first document has no utility in translating other portions of the first document, the translation of the portion of the first document may have utility in translating portions of other documents. As described in connection with FIG. 4 and FIG. 5, in some embodiments, the remote translation memory 250 is not limited to a single document when identifying portions of documents for which an existing translation may be useful. In one of these embodiments, the ability to reuse translations across documents provides increased functionality to a user of the system. For example, and in some embodiments, thousands of translators worldwide may provide portions of documents to a translation memory, which generates translations for each portion and provides other translators access to those translations for use in their own documents, and for incorporation into their local translation memories, as described above in connection with FIGS. 2 and 3.

Figure 6:
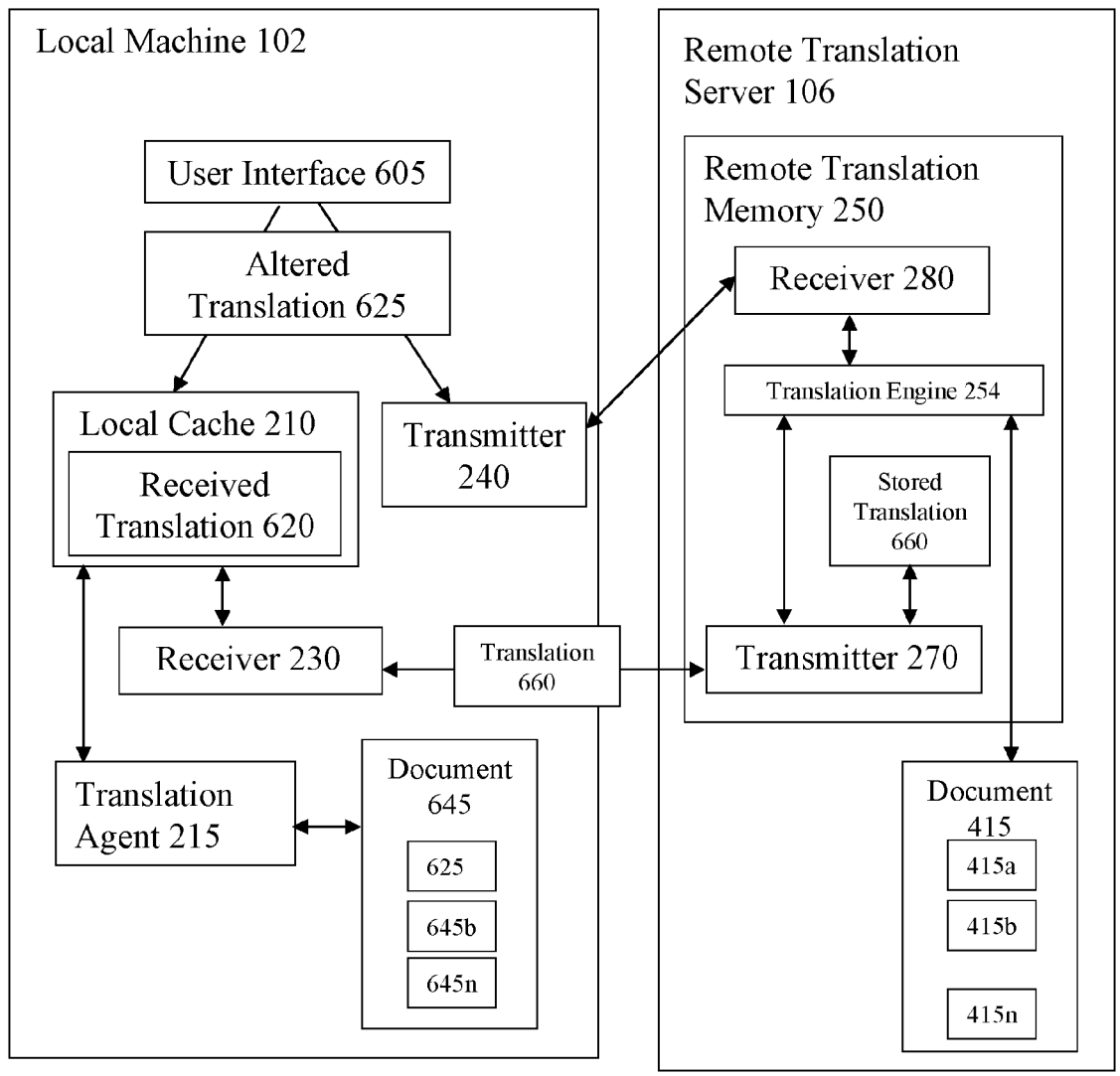
FIG. 6 is a block diagram depicting one embodiment of a system for local, computer-aided translation incorporating translator revisions to remotely-generated translation predictions.

Referring now to FIG. 6, a block diagram depicts one embodiment of a system for local, computer-aided translation incorporating translator revisions to remotely-generated translation predictions. The system includes a remote translation server 106 and a local machine 102. In brief overview, the remote translation server 106 comprises a remote translation memory 250 providing access to a stored translation 660, a remote translation engine 254 determining that the stored translation 660 is useful in translating a first portion of a document 645, and a transmitter 270 transmitting the stored translation 660. The local machine 102 comprises a receiver 240, a local cache 210, a user interface 605, and a translation agent 215. The receiver 240 receives the translation 660 of the first portion of the document 645. The local cache 210 stores the translation 660 of the first portion of the document 645. The user interface 605 receives from a translator an alternate version 625 of the translation 660 of the first portion of the document 645. The translation agent 215 identifies the alternate version 625 of the translation 660 of the first portion of the document 645 as useful in the translation of a second portion of the document 645 and generates a translation of the second portion of the document 645 through reuse of the alternate version of the translation 625 of the first portion of the document 645, responsive to the identification of the utility of the alternate version 625 of the translation 660 of the first portion of the document 645 in the translation of the second portion of the document 645.

Referring now to FIG. 6, and in greater detail, in some embodiments, the remote translation server 106 and the local machine 102 include the components and provide the functionality of the remote translation server 106 and the local machine 102 described in connection with FIG. 2-5. The remote translation server 106 comprises a remote translation memory 250 that provides access to a stored translation 660. In one embodiment, the remote translation memory 250 stores the translation 660. In another embodiment, the remote translation memory 250 stores a plurality of translations 660. In still another embodiment, one or more local machines 102 access the remote translation server 106 to request one of a plurality of translations 660 from the remote translation memory 250. In some embodiments, the remote translation server 106 provides the functionality of the remote translation server 106 as described above in connection with FIG. 2.

In one embodiment, the remote translation server 106 comprises a receiver 280. In another embodiment, the receiver 280 receives a request for the translation 660. In still another embodiment, the receiver 280 receives a request, from a local machine 102, for a translation of a first portion of a local document 645. In still another embodiment, the receiver 280 receives a request for the translation 660 or for a translation of a portion of a local document 645 from one or more local machines 102. In yet another embodiment, the receiver 280 receives, from a local machine 102, a modification to a translation 660 stored in the remote translation memory 250.

In some embodiments, the remote translation server 106 includes a means for determining that a translation 660 is useful in translating a first portion of a document 645. In one of these embodiments, the remote translation engine 254 determines that the stored translation 660 is useful in translating a first portion of a document 645. In another of these embodiments, the remote translation engine 254 comprises a database. In still another of these embodiments, the remote translation engine 254 comprises a table. In one embodiment, the remote translation engine 254 provides the functionality described above in connection with FIG. 2.

The remote translation server 106 comprises a transmitter 270 transmitting the stored translation. In one embodiment, the transmitter 270 sends the stored translation 660 to the local machine 102. In another embodiment, the transmitter 270 sends the stored translation to the translation agent 215 on the local machine 102. In still another embodiment, the transmitter 270 received an identification of the stored translation 660 to send to the local machine 102 from the remote translation engine 254.

The local machine 102 comprises the receiver 230, the local cache 210, the user interface 605, and the translation agent 215. The receiver 230 receives the translation 660 of the first portion of the document 645. In one embodiment, the receiver 230 receives an updated version 625 of the translation 660 replacing the received translation 620. The local cache 210 stores the translation 660 of the first portion as received translation 620. In some embodiments, the local machine 102 comprises a client 102 as described above in connection with FIG. 1A and FIG. 1B.

In one embodiment, the local machine includes a transmitter 240 sending a request for an updated version of the translation 620 to the remote translation server 106. In another embodiment, the transmitter 240 sends the request for the updated version before the translation agent 215 receives a request for the translation. In still another embodiment, the transmitter sends alternate versions, modified versions, or new translations to the remote translation server 106.

The user interface 605 receives, from a translator, an alternate version of the translation of the first portion of the document. In one embodiment, the user interface 605 receives the alternate version 625 of the translation 620 upon displaying the translation 620 to the translator. In another embodiment, the user interface 605 includes a user interface element for receiving, from the translator, the altered translation 625.

In one embodiment, the local machine 102 includes an application program that receives the translation 660, stores the translation 660 in the local cache, and generates a translation of at least a portion of the document 645 using the received translation 620. In another embodiment, the application program provides a user interface 605 for receiving a modification from a translator. In some embodiments, the application program includes the translation agent 215.

As will be described in greater detail below, in connection with FIG. 8 and FIG. 9, in some embodiments, the local machine 102 comprises a means for determining whether an updated version of a received translation 620 makes the received translation 620 obsolete. In one embodiment, the transmitter 240 sends a request to the remote translation server 106 for an indication of whether the remote translation server 106 stores an updated version of the translation 620. In another embodiment, the remote translation server 106 transmits an indication, to the local machine 102, that an updated version of a translation 660 exists. In still another embodiment, the translation agent 215 determines whether an updated version of the translation makes the received translation obsolete. In some embodiments, the receiver 230 receives the updated version of the translation 660 and replaces the previously received translation 620 with the updated version of the translation 660.

The local machine 102 receives from a translator an alternate version of the translation 625 of the first portion of the document 645. In some embodiments, the receiver 230 receives the alternate version of the translation 625. In one of these embodiments, the receiver 230 stores the alternate version of the translation 625 in the local cache 210. In other embodiments, the user interface 605 receives the alternate version of the translation 625 from the translator. In still other embodiments, the transmitter 240 sends the alternate version of the translation 625 to the remote translation server 106.

In some embodiments, the translator reviews the translation of a portion of the document 645, the translation generated with the received translation 620. In another of these embodiments, the translator requests generation of a second translation of the first of the document 645 based on a second translation 660'. In still another of these embodiments, the translator modifies the generated translation of the first portion of the document 645.

The translation agent 215 identifies the alternate version of the translation 625 of the first portion of the document 645 as useful in the translation of a second portion of the document 645. In some embodiments, the translation agent 215 includes a means for determining that the alternate version of the translation 625 is useful in translating a first portion of a document 645. In one of these embodiments, the means for determining the utility of the alternate version of the translation 625 comprises a database. In another of these embodiments, the means for determining the utility of the alternate version of the translation 625 comprises a table. In some embodiments, the determination that the alternate version of the translation 625 is useful in translating a first portion of a document 645 is made as described above in connection with FIG. 2.

The translation agent 215 generates a translation of the second portion of the document 645 through reuse of the alternate version of the translation 625 of the first portion of the document 645, responsive to the identification of the utility of the alternate version translation 625 of the first portion of the document 645 in the translation of the second portion of the document 645. In one embodiment, the translation agent 215 generates a translation of the second portion of the document 645 by replacing the second portion of the document 645, such as portion 645*b*, with the alternate version of the translation 625. In another embodiment, an application program on the local machine 102 generates the translation of the second portion of the document 645. In still another embodiment, the user interface 605 displays the translation of the second portion of the document 645 to a translator. In yet another embodiment, the local machine 102 receives additional alternate versions of the translation 625 from the translator responsive to a review of the translation of the second portion of the document 645. In some embodiments, the translation agent 215 generates a translation of a third portion of the document 645 through reuse of the alternate version of the translation 625 of the first portion of the document 645, responsive to the identification of the utility of the alternate version translation 625 of the first portion of the document 645 in the translation of the third portion of the document 645. In other embodiments, the translation agent 215 transmits the alternate version of the translation 625 to the remote translation memory 250. In one of these embodiments, the remote translation memory 250 determines that the alternate version of the translation 625 is useful in translating a portion of a second document. In another of these embodiments, the remote translation memory 250 transmits the alternate version of the translation 625 and an identification of the utility of alternate version of the translation 625 to a local machine 102 on which the second document resides.

Figure 7:
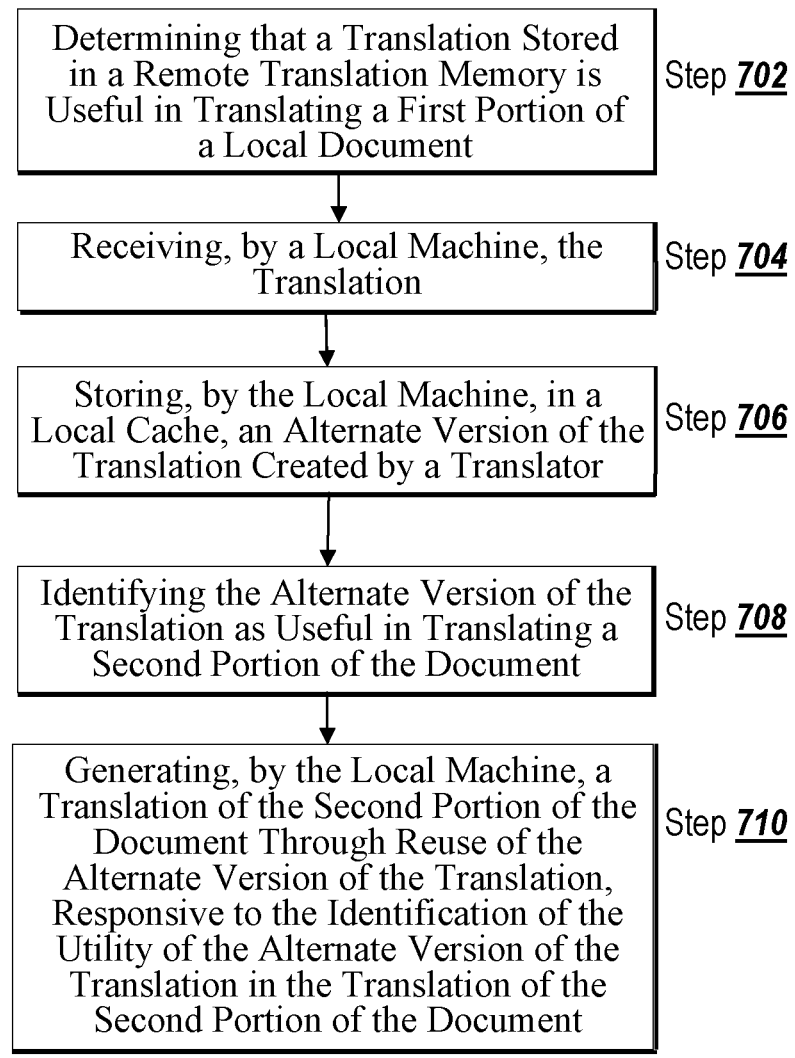
FIG. 7 is a flow diagram depicting one embodiment of the steps taken in a method for local, computer-aided translation incorporating translator revisions to remotely-generated translation predictions.

Referring now to FIG. 7, a flow diagram depicts one embodiment of the steps taken in a method for local, computer-aided translation incorporating translator revisions to remotely-generated translation predictions. In brief overview, a determination is made that a translation stored in a remote translation memory is useful in translating a first portion of a local document (step 702). A local machine receives the translation (step 704). The local machines stores, in a local cache, an alternate version of the translation created by a translator (step 706). The alternate version of the translation is identified as useful in translating a second portion of the document (step 708). The local machine generates a translation of the second portion of the document through reuse of the alternate version of the translation, responsive to the identification of the utility of the alternate version of the translation in the translation of the second portion of the document (step 710).

Referring now to FIG. 7, and in greater detail, a determination is made that a translation stored in a remote translation memory is useful in translating a first portion of a local document (step 702). In one embodiment, the remote translation server 106 makes the determination. In another embodiment, the remote translation memory 250 makes the determination, the remote translation memory 250 accessed by a plurality of local machines. In still another embodiment, the determination is made responsive to receiving a request for a translation of the first portion of the local document. In yet another embodiment, one or more local machines make the request for the translation.

A local machine receives the translation (step 704). In one embodiment, the local machine 102 stores the received translation 620 in a local cache 210. In another embodiment, the local machine 102 receives the translation responsive to sending a request to the remote translation server 106 for the translation.

In some embodiments, and as discussed in greater detail below in connection with FIG. 8 and FIG. 9, the local machine 102 makes a determination as to whether an updated version of the translation makes the received translation obsolete. In one of these embodiments, the remote translation memory 250 receives a request for an updated version of the translation. In other embodiments, the local machine 10 receives an updated version of the translation, which replaces the received translation 620.

The local machines stores, in a local cache, an alternate version of the translation created by a translator (step 706). In one embodiment, the local machine 102 receives, from the translator, a modification of a received translation 620. In another embodiment, the local machine 102 receives, from the translator, a replacement of a received translation 620. In still another embodiment, the local machine 102 transmits, to the remote translation memory, the alternate version of the translation.

The alternate version of the translation is identified as useful in translating a second portion of the document (step 708). In one embodiment, the local machine 102 identifies the alternate version of the translation as useful in translating the second portion of the document responsive to receiving a request for translation of the second portion of the document. The local machine generates a translation of the second portion of the document through reuse of the alternate version of the translation, responsive to the identification of the utility of the alternate version of the translation in the translation of the second portion of the document (step 710). In one embodiment, the local machine 102 generates a translation of the second portion of the document by replacing the second portion of the document with the alternate version of the translation in a copy of the document. In another embodiment, a translation of a portion of a document is added to the document and displayed in addition to the second portion of the document.

In some embodiments, and as described above in connection with FIG. 4 and FIG. 5, a translation may be determined to have utility in translating a portion of a second document. In one of these embodiments, the translation agent 215 transmits an altered version received from a translator to the remote translation memory 250. In another of these embodiments, the remote translation memory 250 transmits the altered version of the translation with an identification of the utility of the altered version of the translation to a translation of a portion of a second document to the translation agent 215 on the local machine 102. In still another of these embodiments, the remote translation memory 250 transmits the altered version of the translation with an identification of the utility of the altered version of the translation to a translation of a portion of a second document to a second translation agent 215' on a second local machine 102*b*.

Figure 8:
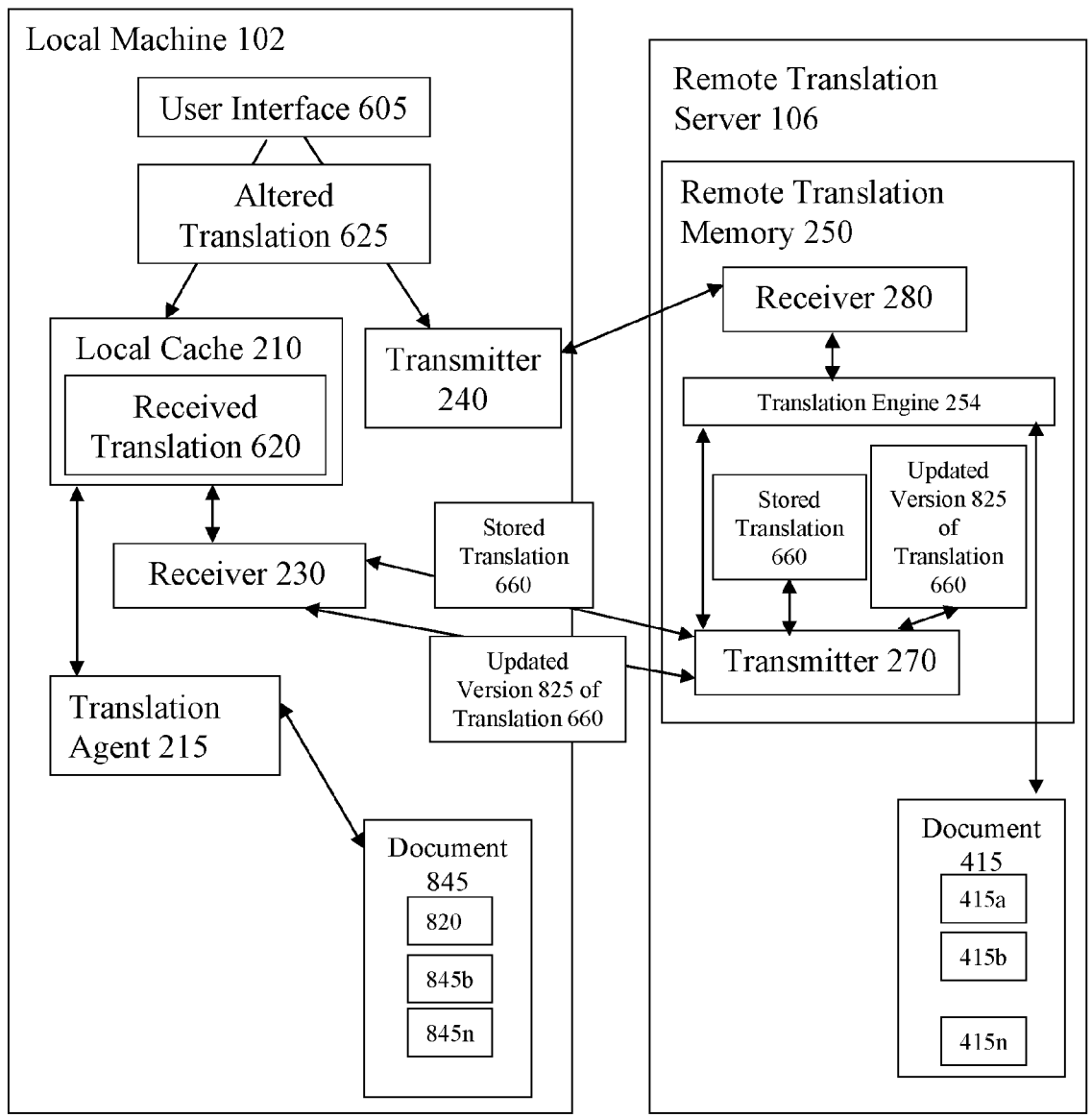
FIG. 8 is a block diagram depicting another embodiment of a system for maintaining and updating remotely-generated translation predictions.

Referring now to FIG. 8, a block diagram depicts another embodiment of a system for maintaining and updating remotely-generated translation predictions. The system includes a remote translation server 106 and a local machine 102. In brief overview, the remote translation server 106 includes a remote translation memory, a remote translation engine and a transmitter. The remote translation memory 250 provides access to a stored translation 660. The remote translation engine 254 determines that the stored translation 660 is useful in translating a first portion of a document 245. The transmitter 270 transmits the stored translation 660. The local machine 102 includes a receiver 230 and a translation agent 215. The receiver 230 receives the translation 660 of the first portion of the document 245. The translation agent 215 determines, prior to receiving from a translator a request for a translation of the first portion of the document 245, that the remote translation memory stores an updated version of the translation 825, identifies the updated version of the translation 825 as useful in translating a second portion of the document 245, and generates a translation of the second portion of the document 245 through reuse of the updated version of the translation 825, responsive to the identification of the utility of the updated version of the translation 825 of the first portion of the document 245 in translating the second portion of the document 245.

Referring now to FIG. 8, and in greater detail, in some embodiments, the remote translation server 106 and the local machine 102 include the components and provide the functionality of the remote translation server 106 and the local machine 102 described in connection with FIG. 2-7. The remote translation server 106 includes a remote translation memory, a remote translation engine and a transmitter. The remote translation memory 250 provides access to a stored translation 660. The remote translation engine 254 determines that the stored translation 660 is useful in translating a first portion of a document 245. The transmitter 270 transmits the stored translation 660. In one embodiment, the remote translation server 106 provides the functionality of the remote translation server 106 described above in connection with FIG. 2, FIG. 4, and FIG. 6.

The local machine 102 provides the functionality of the local machine 102 described above in connection with FIG. 2, FIG. 4, and FIG. 6. The translation agent 215 determines, prior to receiving from a translator a request for a translation of the first portion of the document 845, that the remote translation memory 250 stores an updated version 825 of the translation 660. In one embodiment, the receiver 230 receives the translation 660 before receiving a request from a translator for a translation of a first portion of the document 245. In another embodiment, the receiver 230 on the local machine 102 receives a request for a translation of the second portion of the document.

In some embodiments, the translation agent 215 includes two processes. In one of these embodiments, a first process identifies a received translation 620 for use in translating a first portion of a document 645. In another of these embodiments, a second process maintains and updates received translations 620, requesting updates from the remote translation memory 250 and replacing received translations 620 as updated versions 825 obsolete the received translations 620. In still another of these embodiments, the second process may update a translation 620 before the first process receives a request for a translation of a portion of a document, the translation requiring the use of the translation 620.

In one embodiment, the translation agent 215 determines whether the updated version 825 of the translation 660 makes the received translation 620 obsolete. In some embodiments, the translation agent 215 requests the updated version 825 from the remote translation server 106. In one of these embodiments, the transmitter 240 on the local machine 102 sends the request for the updated version 825 of the translation to the remote translations server 106. In other embodiments, the remote translation server 106 automatically transmits an updated version 825 of the translation 660 upon receiving the updated version 825. In one of these embodiments, the receiver 230 on the local machine 102 receives an indication that the remote translation memory 250 stores the updated version 825 of the translation 660. In another of these embodiments, the receiver 230 on the local machine 102 receives an updated version 825 of the translation 660, replacing the received translation 620. In other embodiments, the local machine 102 stores the updated version 825 of the translation 660 in a local cache 210. In still other embodiments, the local machine 102 receives, from a translator, a modification to the updated version 825 of the translation 660.

The translation agent 215 identifies the updated version 825 of the translation 660 as useful in translating a second portion of the document 845. In some embodiments, the local machine 102 includes a means for determining that the updated version 825 of the translation 660 is useful in translating a second portion of a document 845. In one of these embodiments, the means for determining the utility of the updated version 825 of the translation 660 comprises a database. In another of these embodiments, the means for determining the utility of the updated version 825 of the translation 660 comprises a table.

The translation agent 215 generates a translation of the second portion of the document 845 through reuse of the updated version 825 of the translation 660, responsive to the identification of the utility of the updated version 825 of the translation 660 of the first portion of the document 845 in translating the second portion of the document 845. In one embodiment, the translation agent 215 generates a translation of the second portion of the document 845 by replacing the second portion of the document 845 with the updated version 825 of the translation 660. In another embodiment, an application program on the local machine 102 generates the translation of the second portion of the document 845.

In some embodiments, the user interface 605 displays an obsolete version of a translation 660. In one of these embodiments, the user interface 605 displays the obsolete version of the translation 660 before a translation agent 215 has received an updated version 825 of the translation 660 from the remote translation memory 250. In another of these embodiments, the user interface 605 displays a graphical user interface element to the translator when the translation agent 215 receives the updated version 825 of the translation 660 of the first portion of the document 825. In still another of these embodiments, the user interface 605 receives from the translator, via the graphical user interface element, an indication as to whether to replace the obsolete version of the translation 660 with the updated version 825 of the translation 660.

In one embodiment, the user interface 605 displays the translation of the second portion of the document 845 to a translator. In another embodiment, the user interface 605 receives an alternate version 625 of the translation 825 from the translator, responsive to a review of the translation of the second portion of the document 845.

In some embodiments, the translation agent 215 generates a translation of a third portion of the document 845 through reuse of the updated version 825 of the translation 660 of the first portion of the document 825, responsive to the identification of the utility of the updated version 825 of the translation 660 of the first portion of the document 845 in the translation of the third portion of the document 845. In other embodiments, the translation agent 215 transmits the updated version 825 of the translation 660 of the first portion of the document 825 to the remote translation memory 250. In one of these embodiments, the remote translation memory 250 determines that the updated version 825 of the translation 660 of the first portion of the document 825 is useful in translating a portion of a second document. In another of these embodiments, the remote translation memory 250 transmits the updated version 825 of the translation 660 of the first portion of the document 825 and an identification of the utility of the updated version 825 of the translation 660 of the first portion of the document 825 on which the second document resides.

Figure 9:
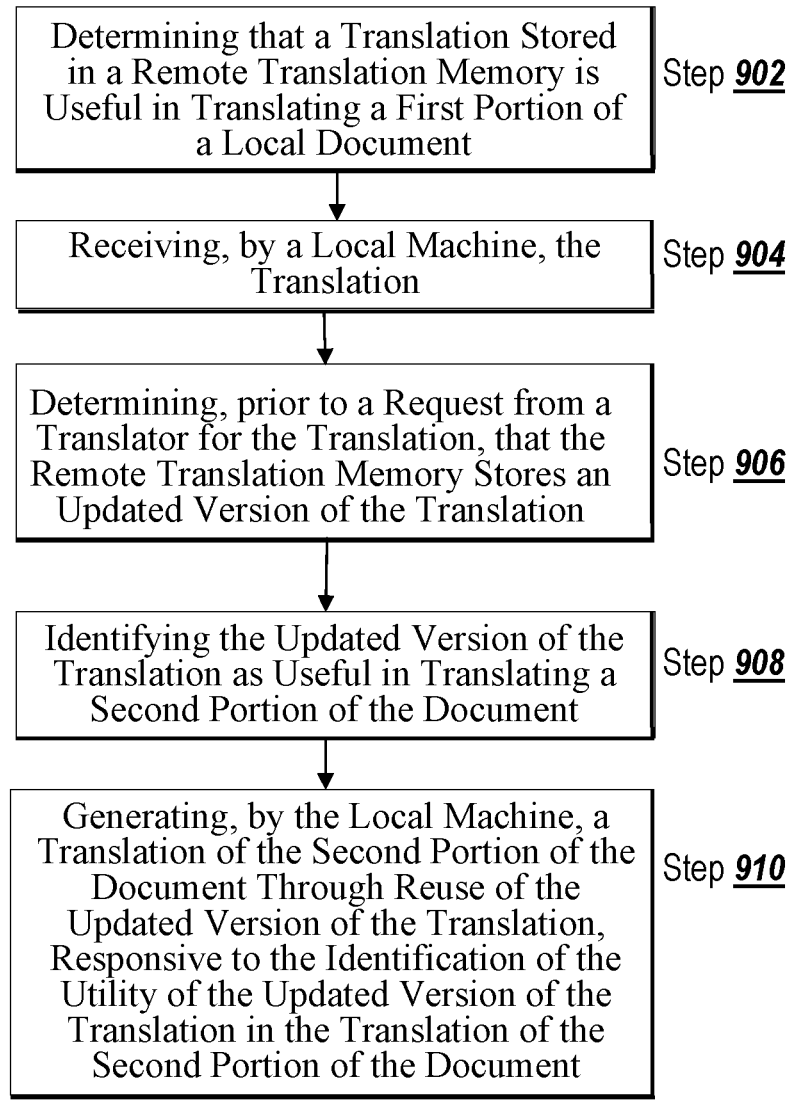
FIG. 9 is a flow diagram depicting another embodiment of the steps taken in a method for maintaining and updating remotely-generated translation predictions.

Referring now to FIG. 9, a flow diagram depicts another embodiment of the steps taken in a method for maintaining and updating remotely-generated translation predictions. In brief overview, a determination is made that a translation stored in a remote translation memory is useful in translating a first portion of a local document (step 902). A local machine receives the translation (step 904). The local machines determines, prior to receiving from a translator a request for the translation, that the remote translation memory stores an updated version of the translation (step 906). The updated version of the translation is identified as useful in translating a second portion of the document (step 908). The local machine generates a translation of the second portion of the document through reuse of the updated version of the translation, responsive to the identification of the utility of the updated version of the translation in the translation of the second portion of the document (step 910).

Referring now to FIG. 9, and in greater detail, a determination is made that a translation stored in a remote translation memory is useful in translating a first portion of a local document (step 902). In one embodiment, the remote translation server 106 makes the determination as described above in connection with step 702 of FIG. 7. A local machine receives the translation (step 904). In one embodiment, the local machine 102 received translation 620 and provides the functionality described above in connection with step 704 of FIG. 7.

The local machine 102 determines, prior to receiving from a translator a request for the translation, that the remote translation memory stores an updated version 825 of the translation 660 (step 906). In one embodiment, the local machine 102 determines that the updated version 825 of the translation 660 makes the received translation obsolete. In another embodiment, the receiver 230 on the local machine 102 requests, from the remote translation memory, the updated version 825 of the translation 660. In still another embodiment, the local machine 102 receives, form the remote translation memory, an indication that the remote translation memory 250 stores the updated version 825 of the translation 660. In yet another embodiment, the local machine 102 receives the updated version 825 of the translation 660, replacing the received translation 620.

In one embodiment, the local machine 102 stores the updated version 825 of the translation 660 in a local cache 210. In another embodiment, the local machine 102 receives, from a translator, a modification to the updated version 825 of the translation 660.

The updated version 825 of the translation 660 is identified as useful in translating a second portion of the document (step 508). In one embodiment, the local machine 102 identifies the updated version 825 of the translation 660 as useful in translating the second portion of the document 845 responsive to receiving a request for translation of the second portion of the document. In another embodiment, the local machine 102 identifies the updated version 825 of the translation 660 as useful in translating the second portion of the document 845 upon receiving the request for the translation.

The local machine generates a translation of the second portion of the document through reuse of the updated version of the translation, responsive to the identification of the utility of the updated version of the translation in the translation of the second portion of the document (step 910). In one embodiment, the local machine 102 generates a translation of the second portion of the document by replacing the second portion of the document with the updated version of the translation in a copy of the document.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and systems for local, computer-aided translation using remotely-generated translation predictions, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method for local, computer-aided translation using remotely-generated translation predictions, the method comprising the steps of:
    (a) determining that a translation stored in a remote translation memory is useful in translating a first portion of a local document;
    (b) receiving, by a local machine, the stored translation;
    (c) determining, by the local machine, prior to receiving a communication from the remote translation memory indicating that the remote translation memory stores an updated version of the stored translation, and prior to receiving a request from a translator for the translation of the first portion of the local document, that the remote translation memory stores an updated version of the stored translation;
    (d) identifying, by the local machine, that the updated version of the stored translation is useful in translating a second portion of the local document, wherein the identification occurs before a translation of the second portion of the local document is generated; and
    (e) using the updated version of the stored translation to generate, by the local machine, a translation of the second portion of the local document, the generation of the translation being in response to the identification of the utility of the updated version of the stored translation in translating the second portion of the local document.

2. The method of claim 1, wherein the remote translation memory is accessed by a plurality of local machines.

3. The method of claim 1, wherein step (b) further comprises storing the received translation in a local cache.

4. The method of claim 1, wherein step (c) further comprises determining that the updated version of the stored translation makes the received translation obsolete.

5. The method of claim 1, wherein step (c) further comprises requesting from the remote translation memory, the updated version of the stored translation.

6. The method of claim 1, wherein step (c) further comprises receiving the updated version of the stored translation replacing the received translation.

7. The method of claim 1, wherein step (c) further comprises storing the updated version of the stored translation in a local cache.

8. The method of claim 1, wherein step (c) further comprises receiving, from the translator, a modification to the received translation.

9. The method of claim 1, wherein step (d) further comprises receiving a request for translation of the second portion of the document.

10. A system for local, computer-aided translation using remotely-generated translation predictions comprising:
a remote translation server comprising:
a remote translation memory providing access to a stored translation,
a remote translation engine determining that the translation stored in the remote translation memory is useful in translating a first portion of a document, and
a transmitter transmitting the stored translation; and
a local machine comprising:
a receiver receiving the stored translation, and
a translation agent:
determining, prior to receiving a communication from the remote translation memory indicating that the remote translation memory stores an updated version of the stored translation, and prior to receiving a request from a translator for the translation of the first portion of the document, that the remote translation memory stores an updated version of the stored translation,
identifying the updated version of the stored translation as useful in translating a second portion of the document, wherein the identification occurs before a translation of the second portion of the local document is generated, and
using the updated version of the stored translation to generate a translation of the second portion of the document, the generation of the translation being in response to the identification of the utility of the updated version of the stored translation in translating the second portion of the document.

11. The system of claim 10, wherein the remote translation server is accessed by a plurality of translation agents.

12. The system of claim 10, wherein the remote translation memory stores a plurality of translations.

13. The system of claim 10, wherein the remote translation server further comprises a receiver for receiving, from a local machine, a modification to a translation stored in the remote translation memory.

14. The system of claim 10, wherein the remote translation server further comprises a receiver for receiving, from a local machine, a request for translation of a first portion of a local document.

15. The system of claim 10, wherein the local machine further comprises a local cache storing the received translation.

16. The system of claim 10, wherein the local machine further comprises a local cache storing the updated version of the stored translation.

17. The system of claim 10, wherein the translation agent further comprises a means for determining whether the updated version of the stored translation makes the received translation obsolete.

18. The system of claim 10, wherein the local machine further comprises a transmitter sending a request, to the remote translation server, for the updated version of the stored translation.

19. The system of claim 10, wherein the receiver further comprises a means for receiving an updated version of the stored translation replacing the received translation.

20. The system of claim 10, wherein the receiver further comprises a means for receiving, from the translator, a modification to the received translation.

21. The system of claim 10, wherein the receiver further comprises a means for receiving a request for translation of the second portion of the document.

22. A system for local, computer-aided translation using remotely-generated translation predictions comprising:
a remote translation server comprising:
a memory means for providing access to a stored translation,
a remote processor means for determining that the translation stored in the remote translation memory is useful in translating a first portion of a document, and
a transmitter means for transmitting the stored translation; and
a local machine comprising:
a receiver means for receiving the stored translation, and
a local processor means for:
determining, prior to receiving a communication from the remote translation memory indicating that the remote translation memory stores an updated version of the stored translation, and prior to receiving a request from a translator for the translation of the first portion of the document, that the means for providing access to the stored translation stores an updated version of the stored translation,
identifying the updated version of the stored translation as useful in translating a second portion of the document, wherein the identification occurs before a translation of the second portion of the local document is generated, and
using the updated version of the stored translation to generate a translation of the second portion of the document, the generation of the translation being in response to the identification of the utility of the updated version of the stored translation in translating the second portion of the document.

23. The system of claim 22, wherein the remote translation server is accessed by a plurality of local machines.

24. The system of claim 22, wherein the means for providing access to a stored translation further comprises a means for storing a plurality of translations.

25. The system of claim 22, wherein the remote translation server further comprises a receiver means for receiving, from a local machine, a modification to a translation stored in the means for providing access to a stored translation.

26. The system of claim 22, wherein the remote translation server further comprises a receiver means for receiving, from a local machine, a request for translation of a first portion of a local document.

27. The system of claim 22, wherein the local machine further comprises a means for storing the received translation.

28. The system of claim 22, wherein the local machine further comprises a means for storing the updated version of the stored translation.

29. The system of claim 22, wherein the means for determining that the means for providing access to the stored translation stores an updated version of the stored translation further comprises a means for determining whether the updated version of the stored translation makes the received translation obsolete.

30. The system of claim 22, wherein the local machine further comprises a transmitter sending a request, to the remote translation server, for the updated version of the stored translation.

31. The system of claim 22, wherein the receiver further comprises a means for receiving an updated version of the stored translation replacing the received translation.

32. The system of claim 22, wherein the local machine further comprises a means for receiving, from the translator, a modification to the received translation.

33. The system of claim 22, wherein the receiver further comprises a means for receiving a request for translation of the second portion of the document.

\* \* \* \* \*